US010865759B2

(12) United States Patent
Isaranggulnaayudhya

(10) Patent No.: US 10,865,759 B2
(45) Date of Patent: Dec. 15, 2020

(54) BATTERY ENHANCER FOR A VEHICLE

(71) Applicant: A Tech Aerospace, Inc., Chino, CA (US)

(72) Inventor: Sumit Isaranggulnaayudhya, Apple Valley, CA (US)

(73) Assignee: A Tech Aerospace, Inc., Chino, CA (US)

(*) Notice: Subject to any disclaimer, the term of this patent is extended or adjusted under 35 U.S.C. 154(b) by 203 days.

(21) Appl. No.: 16/112,634

(22) Filed: Aug. 24, 2018

(65) Prior Publication Data
US 2020/0063705 A1 Feb. 27, 2020

(51) Int. Cl.
H01G 11/78 (2013.01)
F02N 11/08 (2006.01)
B60R 16/033 (2006.01)
H01M 10/42 (2006.01)
H01G 11/18 (2013.01)
H02J 7/00 (2006.01)
H02J 7/34 (2006.01)

(52) U.S. Cl.
CPC ........ F02N 11/0866 (2013.01); B60R 16/033 (2013.01); H01G 11/18 (2013.01); H01G 11/78 (2013.01); H01M 10/4264 (2013.01); H02J 7/0013 (2013.01); H02J 7/345 (2013.01)

(58) Field of Classification Search
CPC ... F02N 11/0866; B60R 16/033; H01G 11/18; H01G 11/78; H01M 10/4264; H02J 7/0013; H02J 7/345
See application file for complete search history.

(56) References Cited

U.S. PATENT DOCUMENTS

| 5,359,228 | A | 10/1994 | Yoshida | |
| 5,367,437 | A * | 11/1994 | Anderson | H01G 4/38 257/533 |
| 5,441,122 | A | 8/1995 | Yoshida | |
| 8,922,102 | B2 | 12/2014 | Camilli | |
| 9,287,686 | B2 | 3/2016 | Camilli | |
| 9,461,483 | B1 * | 10/2016 | Hsu | H02J 7/0013 |
| 9,816,475 | B1 | 11/2017 | Buchanan | |
| 2006/0028778 | A1 * | 2/2006 | O'Gorman | H02J 1/14 361/62 |
| 2007/0015047 | A1 | 1/2007 | Hosaka et al. | |
| 2007/0245715 | A1 | 10/2007 | Shiu | |
| 2008/0246443 | A1 | 10/2008 | Doljack | |

(Continued)

FOREIGN PATENT DOCUMENTS

CN 201383524 Y 1/2010
CN 201387911 Y 1/2010

(Continued)

OTHER PUBLICATIONS

The International Search Report and the Written Opinion of the International Searching Authority, or Declaration for International Application No. PCT/US2019/046781, dated Nov. 13, 2019, 10 pages.

Primary Examiner — Rexford N Barnie
Assistant Examiner — Kalu Kelly Emeaba
(74) Attorney, Agent, or Firm — Brett A. Schenck

(57) ABSTRACT

A battery system for a vehicle is provided. The battery system includes a supercapacitor device that is configured to supply power to one or more components of the vehicle in response to various conditions.

5 Claims, 8 Drawing Sheets

(56) References Cited

U.S. PATENT DOCUMENTS

| | | |
|---|---|---|
| 2009/0096285 A1 | 4/2009 | Acena et al. |
| 2010/0101877 A1 | 4/2010 | Masfaraud et al. |
| 2012/0187906 A1* | 7/2012 | Martienssen .......... H01G 9/058 320/109 |
| 2013/0286544 A1* | 10/2013 | Azais ...................... H01G 9/02 361/502 |
| 2014/0255776 A1 | 9/2014 | Song et al. |
| 2017/0229894 A1 | 8/2017 | Durando et al. |
| 2017/0267105 A1* | 9/2017 | Fratelli ................... B60L 15/20 |
| 2018/0183257 A1* | 6/2018 | Minnickel ............... H02J 7/008 |
| 2019/0244767 A1* | 8/2019 | D'Alencon ........... H01M 4/667 |
| 2020/0161725 A1* | 5/2020 | Kalmbach ............... B60L 58/26 |

FOREIGN PATENT DOCUMENTS

| | | |
|---|---|---|
| CN | 101916857 A | 12/2010 |
| CN | 201900987 U | 7/2011 |
| CN | 202487062 U | 10/2012 |
| CN | 202896811 U | 4/2013 |
| CN | 107369562 A | 11/2017 |
| JP | 2010137605 A | 6/2010 |
| KR | 20120006241 A | 1/2012 |

* cited by examiner

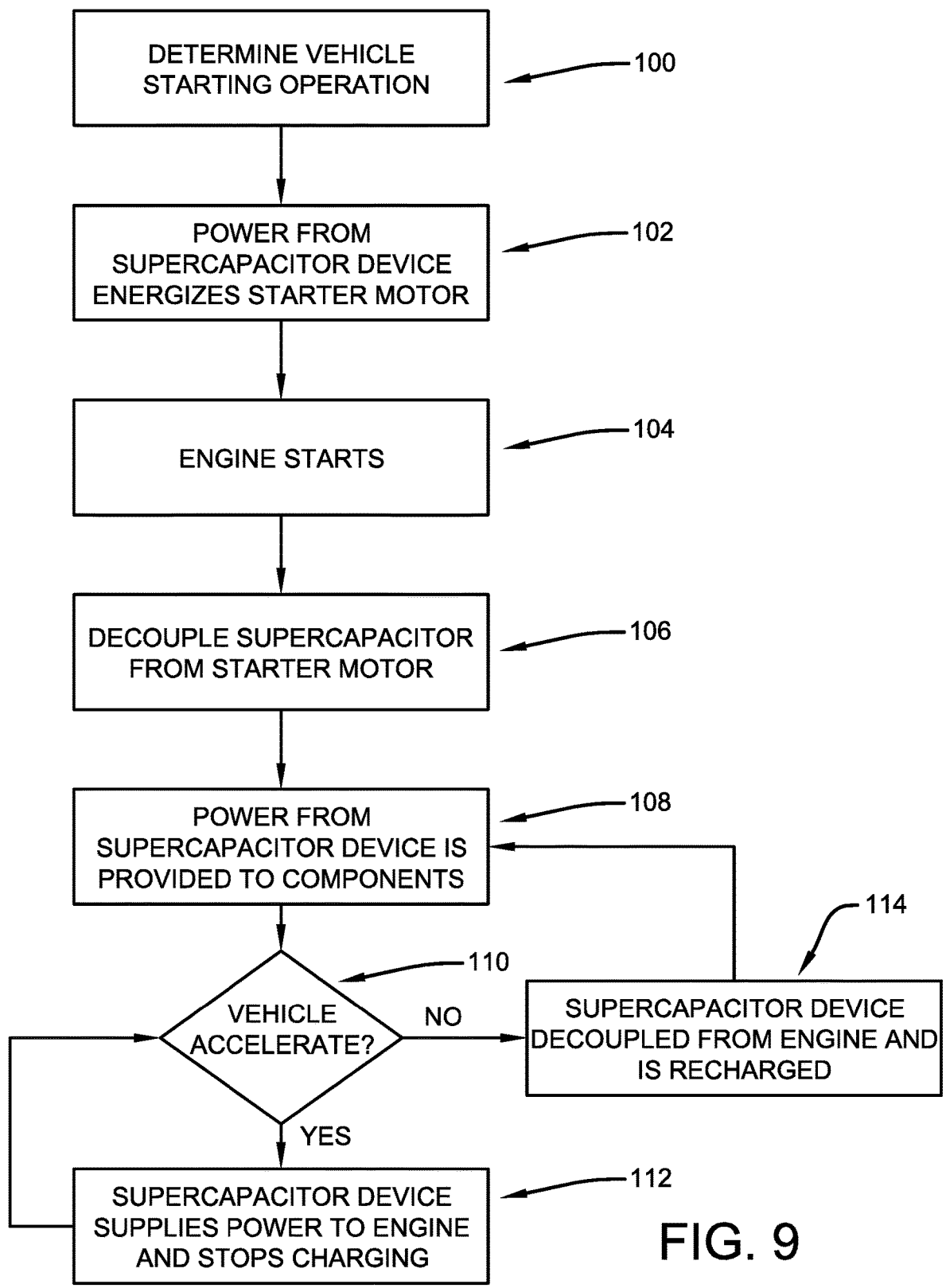

BATTERY ENHANCER FOR A VEHICLE

FIELD

This application relates to a battery enhancer for a vehicle.

BACKGROUND

A battery for a vehicle supplies power to the vehicle in a variety of situations. For example, the battery may provide power to the accessories or components of a vehicle. Also, the car requires a large amount of power from the battery to start and accelerate. Further, a vehicle battery may be prone to draining due to additional power requirements when the engine is running.

Battery systems for vehicles may benefit from improvements.

SUMMARY

In one aspect of the present invention, a battery system for a vehicle is provided. The battery system includes a battery, a starter motor, and a supercapacitor device. The supercapacitor device is operatively connected to the battery. The battery system further includes a controller. The controller is operatively connected to the supercapacitor device and the starter motor. The controller is configured to cause the supercapacitor to energize the starter motor to start the vehicle in response to a signal indicating a vehicle starting operation.

In another aspect of the present invention, an apparatus is provided. The apparatus includes a supercapacitor device for a battery system for a vehicle. The supercapacitor device includes a plurality of supercapacitor cells and first and second layers. The first layer is a conductive element that electrically connects the six supercapacitor cells together. The first layer has a positive side that is configured to be electrically connected to a positive terminal of the battery. The second layer includes a secondary coil that has a negative side that is configured to be electrically connected to a negative terminal of a battery of the battery system.

In another aspect of the present invention, a method is provided. The method includes a) energizing a starter motor of a vehicle by a supercapacitor device electrically couple to the starter motor to start an engine of the vehicle, and b) after the engine starts, causing the supercapacitor device to provide additional power to the engine in response to the engine starting to accelerate.

Other aspects of the disclosed invention will become apparent from the following detailed description, the accompanying drawings and the appended claims.

BRIEF DESCRIPTION OF THE DRAWINGS

FIG. 9 is a flow diagram of a method of operating a vehicle using the supercapacitor device of the present invention.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 2:
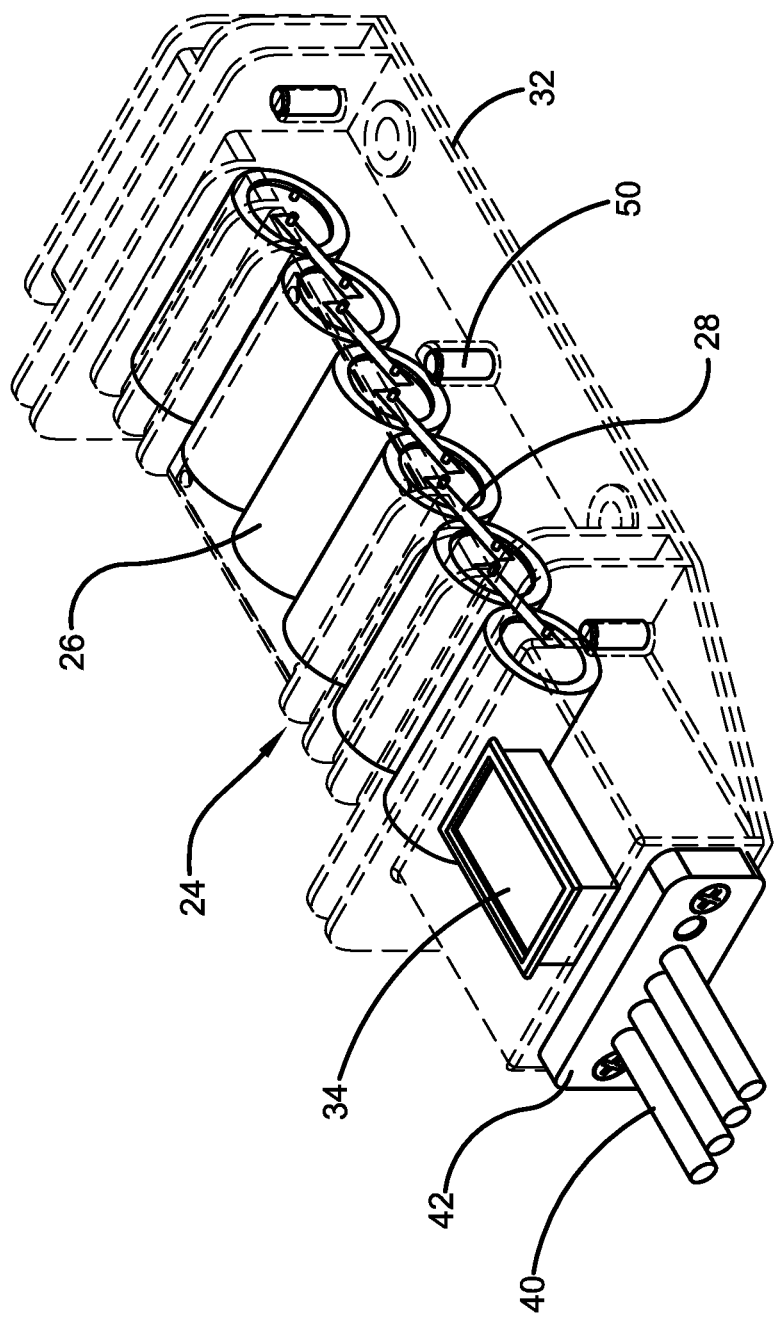
FIG. 2 is a top and front perspective view of the capacitor device and related elements with some portions in phantom according to the embodiment of FIG. 1.
Figure 3:
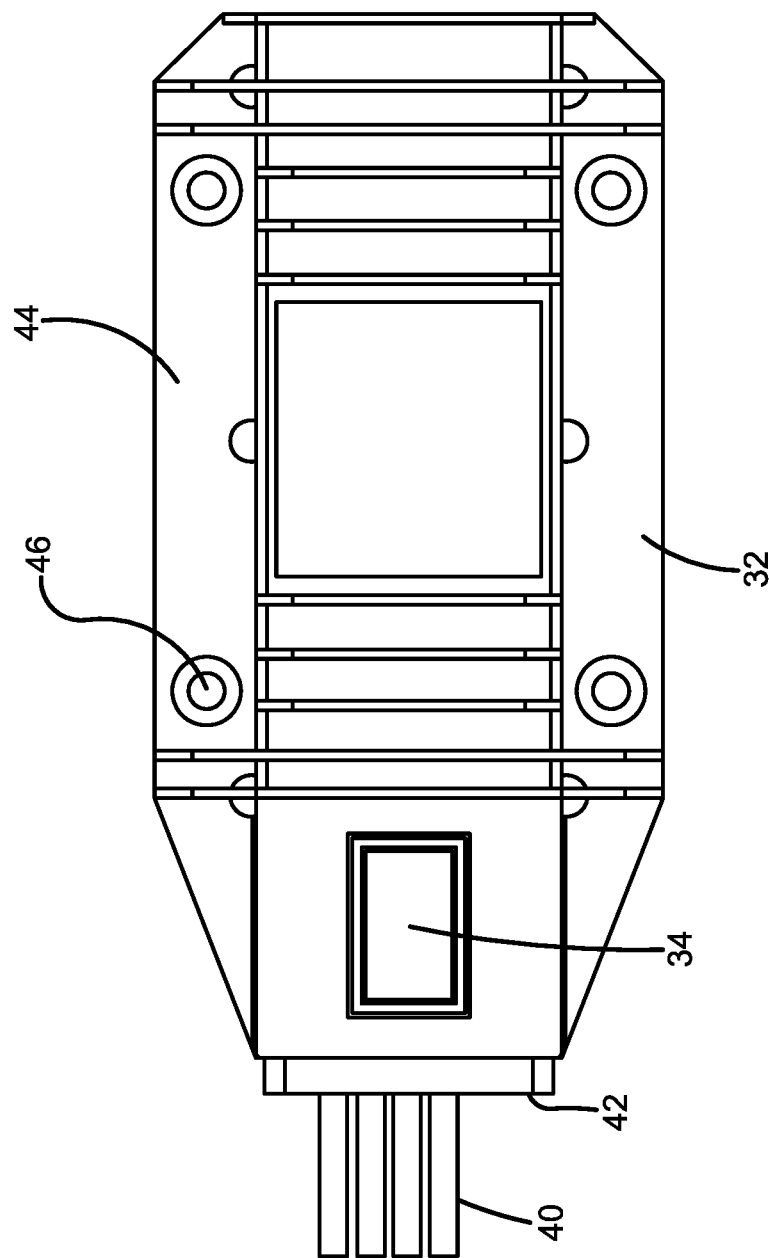
FIG. 3 is a top view of the capacitor device and related elements according to the embodiment of FIG. 1.
Figure 4:
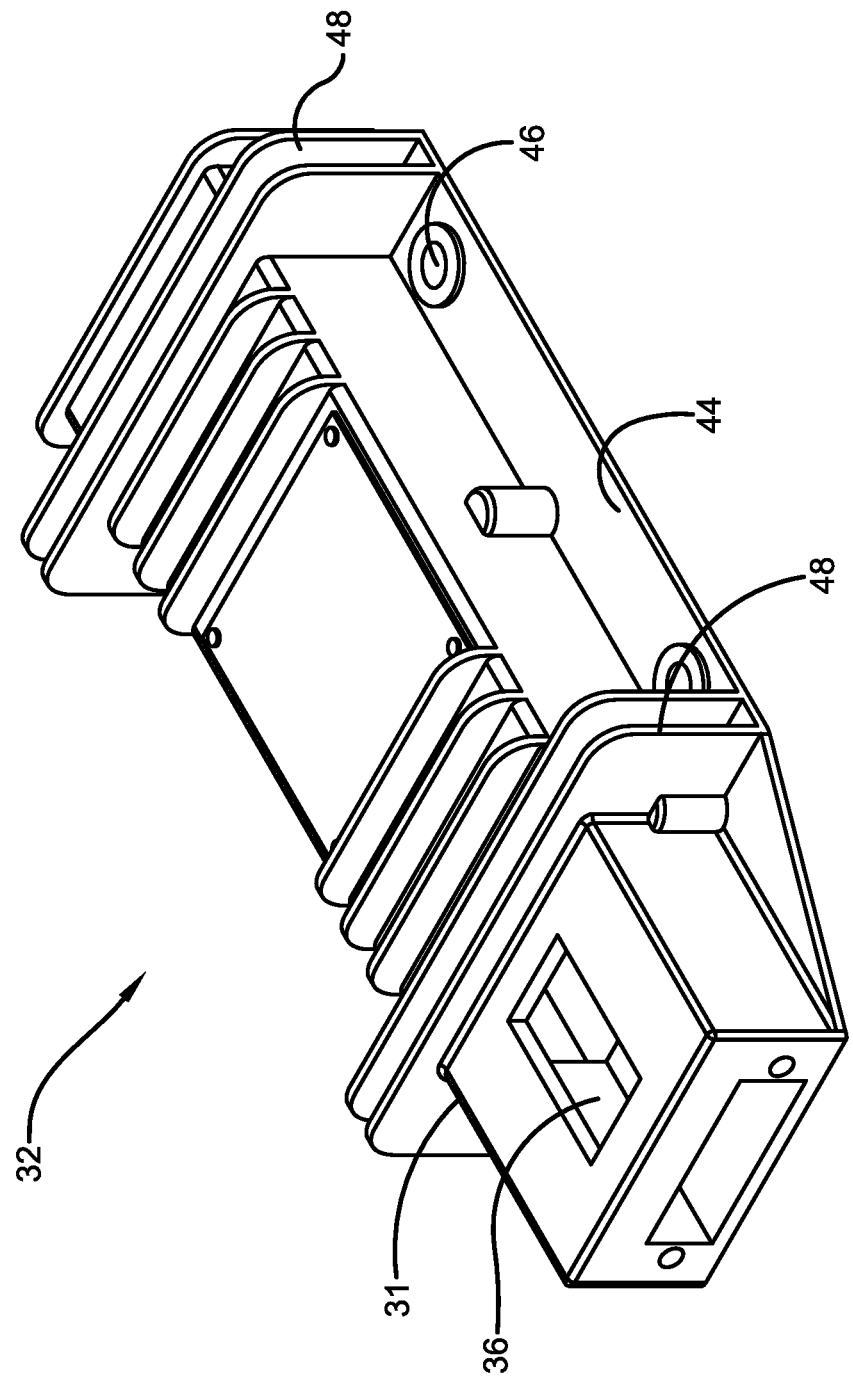
FIG. 4 is a top and front perspective view of the casing according to the embodiment of FIG. 1.
Figure 5:
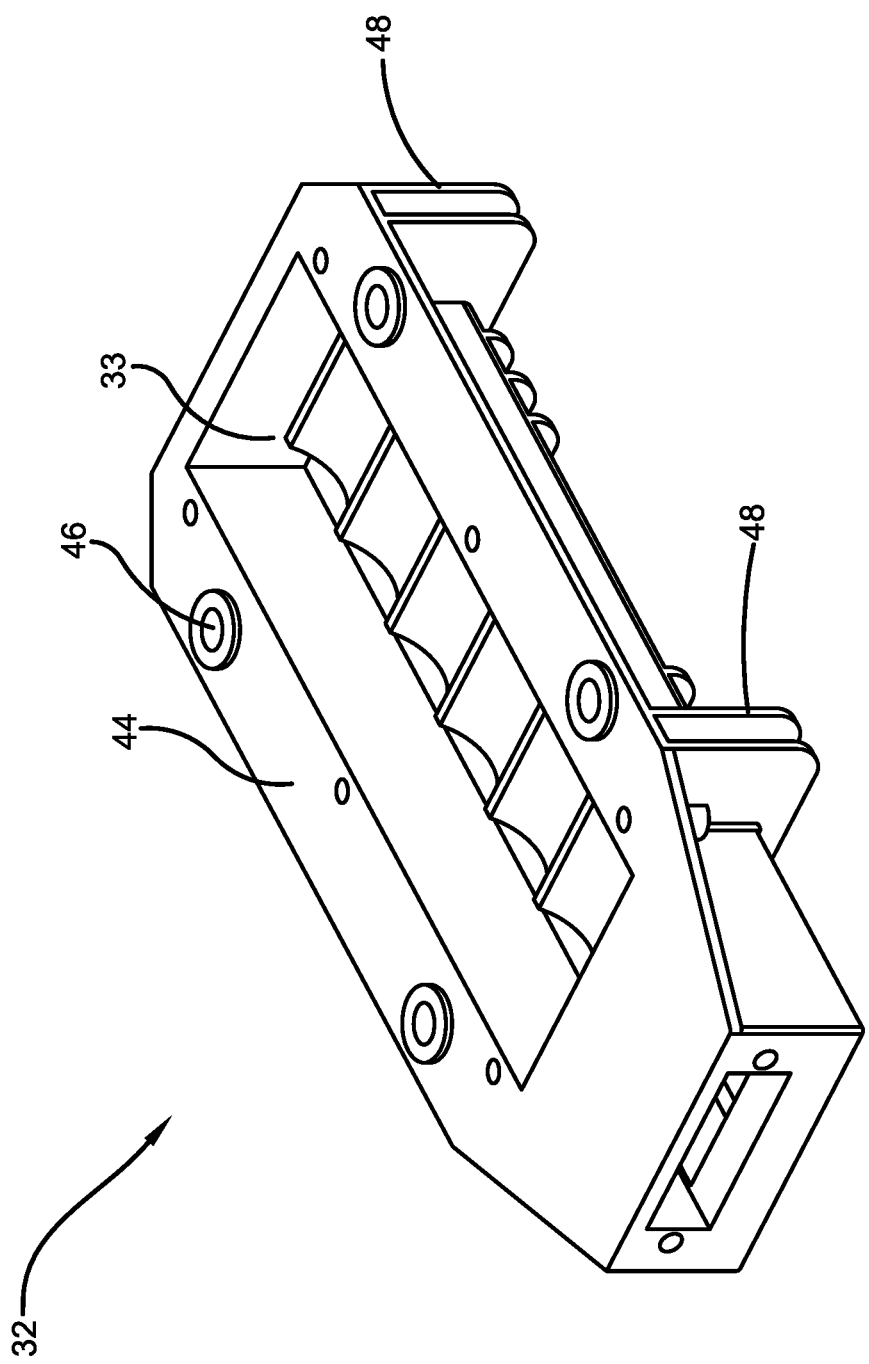
FIG. 5 is a bottom perspective view of the casing according to the embodiment of FIG. 1.

Throughout the present description, the terms "upper", "lower", "top", "bottom", "left", "right", "front", "forward", "rear", and "rearward" shall define directions or orientations with respect to the battery enhancer as illustrated in FIG. 2. It will be understood that the spatially relative terms "upper", "lower", "top", "bottom", "left", "right", "front", "forward", "rear", and "rearward" are intended to encompass different orientations of the battery enhancer in use or operation in addition to the orientation depicted in the figures. For example, if the battery enhancer in the figures is turned over, elements described as "upper" elements or features would then be "lower" elements or features.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Figure 1:
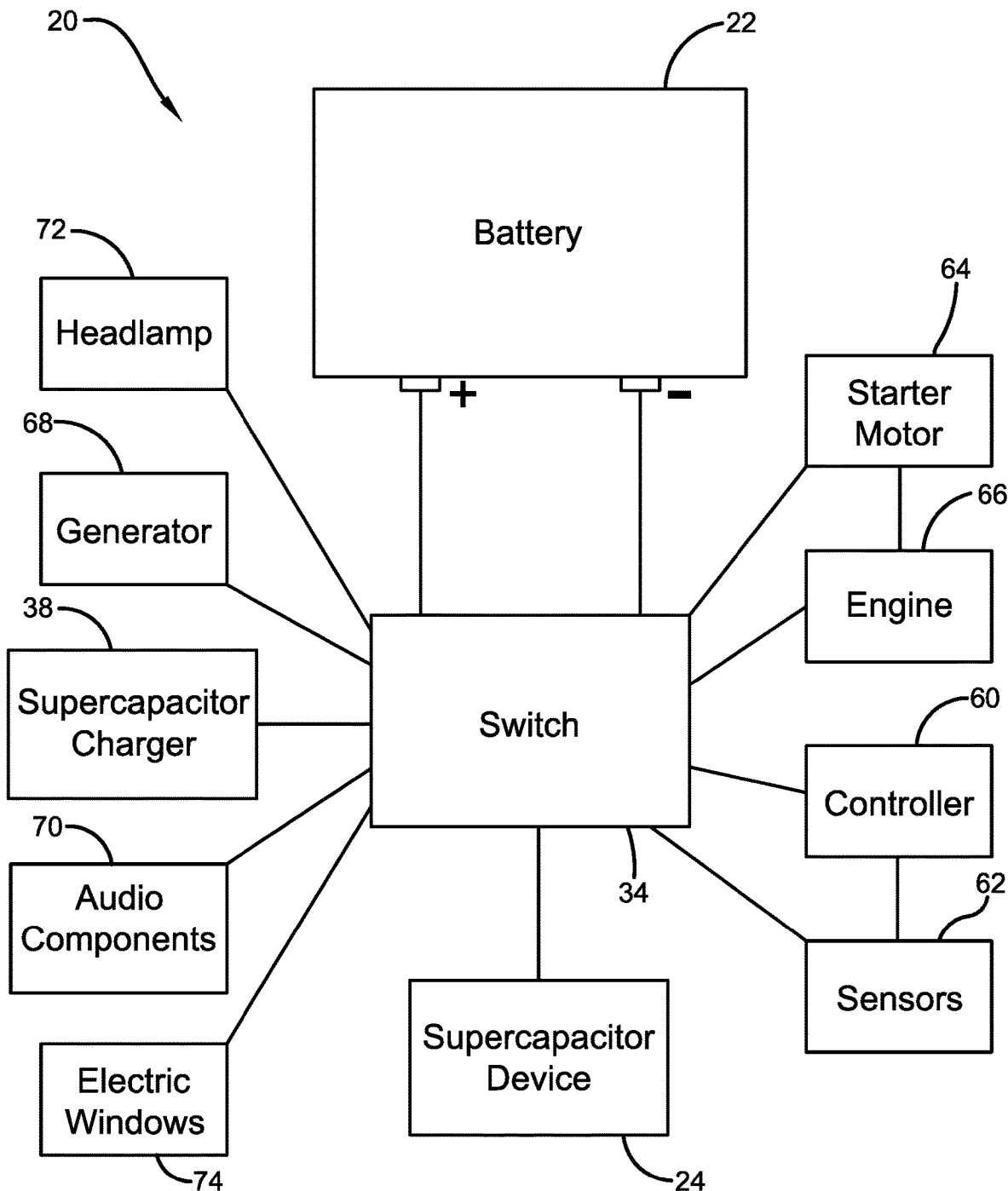
FIG. 1 is block diagram of the battery system according to an embodiment of the present invention.

Referring to FIG. 1, a battery system 20 and related elements for a vehicle is shown. In this embodiment, the vehicle is powered by gasoline. Alternatively, the vehicle may be powered by diesel, electrical or other suitable power source. The battery system 20 comprises a battery 22. The battery 22 may be a lead acid battery or other suitable battery type. The battery system further comprises a supercapacitor device 24. As seen in FIGS. 2 and 6-8, the supercapacitor device 24 comprises a plurality of supercapacitor cells 26 that are electrically coupled to the battery 22 in parallel (FIG. 7).

Figure 8:
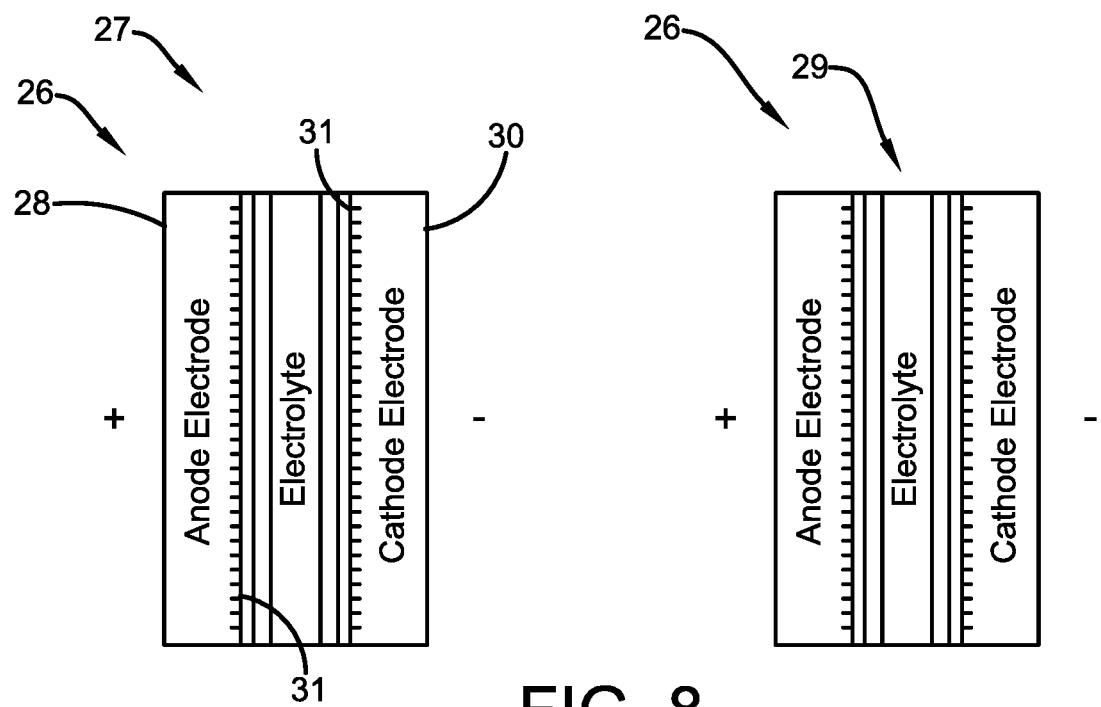
FIG. 8 is a schematic sectional view of supercapacitor cells.

In this embodiment, there are six supercapacitor cells 26, but there can be more or less. The supercapacitor cells 26 use suitable materials to store electrical energy which is then converted to a wave at a Specific Frequency without any electronic circuit. Specifically, the super capacitor cells 26 use a rare-earth element (REE) or rare-earth metal (REM) as an electronic circuit to create an electromagnetic field. This is called the Natural Intelligence Technology (NI). With natural physical properties, it can act as a commander over the electronic circuit. The supercapacitor cells 26 also use electrostatic double-layer capacitance and electrochemical pseudocapacitance, both of which contribute to the total capacitance of the capacitor. As illustrated in FIG. 8, each super capacitor cell 26 has two more layers 28, 30 for protecting and securing a copy. The first layer 28 is a conductive element in the form of a primary coil that electrically connects the six supercapacitor cells 26 together and makes the resistance nearly zero. The first layer 28 has a positive side that is electrically connected to the positive terminal of the battery 22 (FIG. 1). The second layer 30 (FIG. 8) is in the form of a secondary coil that has a negative side that is electrically connected to the negative terminal of the battery 22 (FIG. 1). This arrangement functions as receiver and transmitter to create a frequency. The supercapacitor cell 26 may be a double-layer capacitor 27 or a pseudo capacitor 29. The double-layer capacitor may have electrostatic storage and include Helmholz layers 31. The pseudo capacitor 29 may have electrochemical storage that is accomplished by faradaic redox reactions with charge-transfer.

As illustrated in FIGS. 2-5, the super capacitor cells 26 are housed in a casing 32 that also defines a heat sink. The casing 32 may be made of a suitable material such as an aluminum alloy. The casing 32 includes a capacitor compartment 33 (FIG. 5) that contains the super capacitor cells 26. A switch 34 (FIG. 2) may be provided in a switch compartment 36 (FIG. 4) of the casing 32. The switch 34 may be electrically coupled to other components to control these components of the battery system 20. A supercapacitor charger 38 (FIG. 1) is also electrically connected between the output of the battery 22 and the input of the supercapacitor cells 26. Using the power from the battery 22, the supercapacitor charger 38 charges the supercapacitor cells 26 while the engine is running. Electrical leads 40 extend longitudinally through an interface 42 mounted to an axial end of the casing 32. The casing 32 includes a bottom flange 44 that is located adjacent the surface where the casing 32 is mounted. The flange 44 includes mounting apertures 46 that are configured to receive mounting screws for mounting the casing 22 to the surface. Two pairs of heat sinking fins 48 are attached to the flange at opposite axial ends of the casing 32 and extend upwardly in the direction away from the mounting surface. The supercapacitor compartment 33 may be covered by the structure having the mounting surface or alternatively, by a cover that is located adjacent the mounting surface. The casing 32 may include hollow bosses 50 (FIG. 4) that are configured to securely receive respective fasteners for also fastening the casing 32 to one or more structures.

Figure 6:
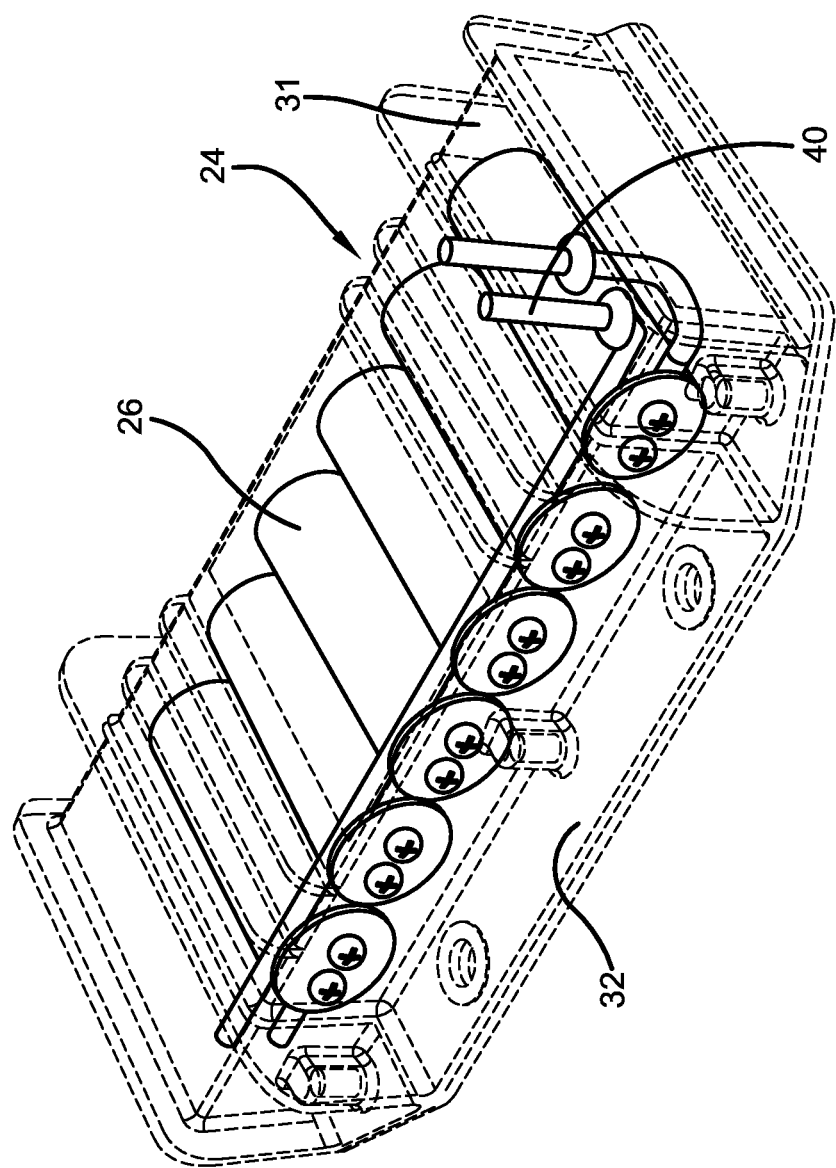
FIG. 6 is a top and rear perspective view of the capacitor device and related elements with some portions in phantom according to the another embodiment of the present invention.
Figure 7:
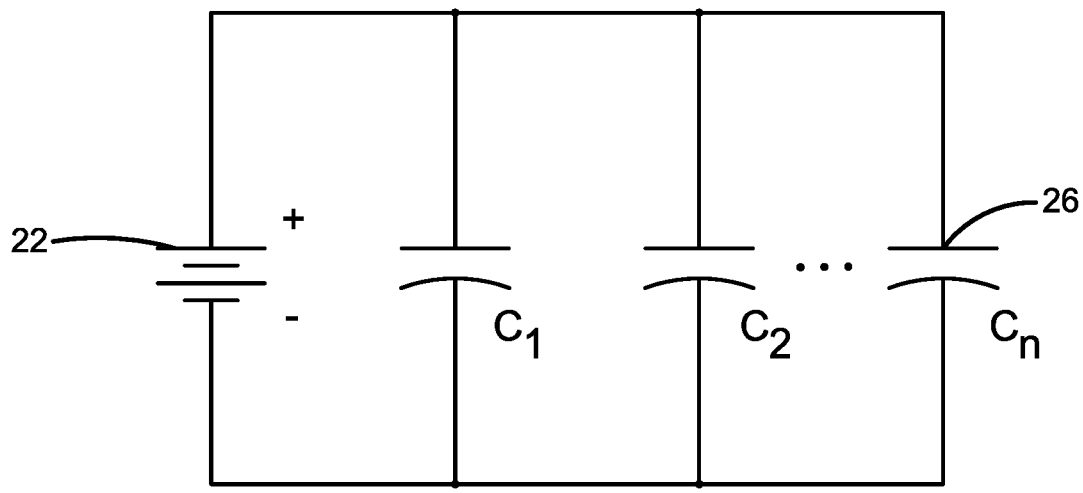
FIG. 7 is a circuit diagram illustrating the supercapacitor cells connected in parallel with the battery according to the present invention.

FIG. 6 shows another version of the casing 32 and related parts. In this version, the switch controller is outside of the casing 32 and the leads 40 from the supercapacitor device 24 extend from the top side 31 (side opposite the side that is adjacent the mounting surface) in a direction perpendicular and away from the top side.

Referring to FIG. 1, the battery system includes a controller 60 or ECU. The controller 60 is operatively connected with the switch 34 and with other components of the vehicle. The controller 60 receives various kinds of operation information from the various components of the vehicle and sensors 62, and controls the operations of a starter motor 64, internal combustion engine 66, the switch 34, and other components of the vehicle. The controller 60 controls timing of the ignition system and injection of the fuel injection system based upon data received from various sensors. For example, the controller 60 may receive information regarding the engine speed from an engine speed sensor, throttle position from a throttle position sensor, engine temperature from a temperature sensor, and engine acceleration for an engine acceleration sensor.

The controller 60 may include one or more processors, and circuits to carry out the functions described herein and may also include appropriate software and/or firmware to cause the processor(s) to carry out the functions of the controller described herein. Alternatively, another controller or this controller may be provided in the casing and operatively connected with the components.

Specifically, the controller 60 may be connected electrically to various sensors 62. These may include a motor temperature sensor, a battery capacity sensor, a catalyst temperature sensor, and the various sensors attached individually to the electric generator 68, and internal combustion engine 66. Also, the controller 60 is connected electrically to various sensors which are arranged in the vehicle and used to detect vehicle operation information, such as the vehicle velocity, depth of accelerator pedal depression, etc. The controller 60 receives from these sensors a motor temperature signal, battery capacity signal, catalyst temperature signal, generator operation information (e.g., temperature and failed state of the electric generator 68), internal combustion engine operation information (e.g., rotation speed, air intake, and throttle valve opening of the internal combustion engine 66), current control device operation information, and vehicle operation information. Based on the various signals and information thus received, the controller 60 sets generator control signals associated with the control of the electric generator 68 for the quantity of generated power, suspension of the power generation, etc., internal combustion engine control signals associated with the control of the internal combustion engine 66 for its starting, stopping, speed. The controller 60 delivers these set control signals to the electric generator 68, internal combustion engine 66, and switch 34.

A method of operating a vehicle using the supercapacitor device 24 will now be described with reference to FIG. 9. In step 100, when a driver turns on a starter key to actuate the vehicle, the processor of the controller 60 discriminates the key-on operation or other starting operation (e.g. push button) that indicates that the vehicle is attempting to start, and starts executing a main routine. More specifically, the processor first executes key-on processes, including reading control data, backed up at the end of the preceding vehicle running cycle, from the memories, checking the operating conditions of the various components of the vehicle). Then in step 102, upon detection of the key-on operation, the controller 60 causes actuation of the switch 38 to electrically couple the supercapacitor device 24 to the starter motor 64 so that sufficient power from the supercapacitor device 24 is supplied to starter motor 64 to start the engine 66. Alternatively, the switch 38 may have control circuitry that discriminates the key-on or other starting operation and then causes actuation of the switch to electrically couple the supercapacitor device 24 to the starter motor 64 such that sufficient power from the supercapacitor device 24 is supplied to starter motor 64 to start the engine 66. Then, in step 104 the starter motor 64 starts the engine 66. Then, in step 106 after the engine starts, the controller 60 causes deactuation of the switch 38 such that the supercapacitor device 24 is electrically decoupled from the starter motor 64. In step 108, the controller 60 causes the supercapacitor device 24 to bypass the battery 22 and supply power to other components of the battery system 20. These components may include at least the car radio or other audio components 70, headlamp 72, electric window 74, and supercapacitor charger 38.

In step 110, the controller 60 determines whether the engine starts to accelerate through discrimination of the engine acceleration sensor or other suitable way. If the controller 60 determines that the engine is starting to accelerate, then the controller 60 causes the actuation of the switch 34 to electrically couple the supercapacitor device 24 to the engine to provide additional power to the engine and also stops the charging operation of the supercapacitor charger 38 in step 112. When the controller 60 determines that the engine is not accelerating, the controller 60 causes the charging operation of the supercapacitor charger 38 to be resumed and also causes deactuation of the switch 34 such that the supercapacitor device 24 is electrically decoupled from the engine so that the supercapacitor device 24 does not supply additional power to the engine in step 114. When the supercapacitor device 24 connects to a modern circuit such as the controller 60 or ECU, a master/slave type relationship is created with the supercapacitor device 24 acting like the Master and the ECU or controller 60 acting as a Slave. Whenever the supercapacitor device 24 is connected to the battery, the natural Intelligence Technology (NI) as mentioned above controls the controller 60.

The advantages of the battery enhancer for a vehicle are as follows. The supercapacitor cells have capacitance values much higher than other capacitors (but lower voltage limits) that bridge the gap between electrolytic capacitors and rechargeable batteries. The supercapacitor cells can also store more energy per unit volume or mass than electrolytic capacitors, accept and deliver charge much faster than batteries, and tolerate many more charge and discharge cycles than rechargeable batteries. Thus, the vehicle battery will not drain during all phases of the engine running due to the supercapacitor device being charged and discharged faster than the vehicle battery. This and other features of the battery enhancer also extends the life time of the vehicle battery especially batteries that are subjected to extreme weather conditions that affect battery reaction.

The battery enhancer for a vehicle is able to provide better torque and fuel consumption for the vehicle, and increases vehicle performance with nearly zero emission both for both gasoline and diesel engines. The battery enhancer for a vehicle makes the headlamp illuminate brighter, improves the sound system, removes sulfates on the batteries, makes it easier to start the engine, provides a smoother acceleration of the engine and vehicle, reduces engine vibration during idling, improve the function of the electric windows, and requires little maintenance.

Although various embodiments of the disclosed battery enhancer for a vehicle have been shown and described, modifications may occur to those skilled in the art upon reading the specification. The present application includes such modifications and is limited only by the scope of the claims.

What is claimed is:

1. A battery system for a vehicle comprising:
a battery;
a starter motor;
a supercapacitor device, wherein the supercapacitor device is operatively connected to the battery, wherein the supercapacitor device is electrically connected to the battery in parallel, wherein the supercapacitor device comprises a rare-earth element, wherein the rare-earth element comprises an electronic circuit that creates an electromagnetic field, wherein the supercapacitor device comprises a plurality of supercapacitor cells and first and second layers, wherein the first layer is a conductive element that electrically connects the plurality of supercapacitor cells together, wherein the first layer has a positive side that is electrically connected to a positive terminal of the battery, wherein the second layer has a negative side that is configured to be electrically connected to a negative terminal of the battery, wherein the battery and the supercapacitor device are configured to recharge the supercapacitor device after the engine starts running;
a casing, wherein the casing includes a compartment, wherein the supercapacitor cells are housed in the compartment of the casing, wherein the casing defines a heat sink;
a switch, wherein the switch is housed in the casing, wherein the switch is configured to electrically couple the supercapacitor cells to one or more other components of the battery system; and
a controller, wherein the controller is operatively connected to the supercapacitor device and the starter motor, wherein the controller is configured to cause the supercapacitor device to energize the starter motor to start the vehicle in response to a signal indicating a vehicle starting operation, wherein the vehicle includes an engine, wherein the controller is configured to cause the supercapacitor device to be electrically decoupled from the starter motor after the engine starts running, wherein the controller is configured to cause the supercapacitor device to provide additional power to the engine in response to the engine starting to accelerate, wherein the supercapacitor device is configured to supply power to the one or more other components of the vehicle after the engine starts running.

2. The battery system of claim 1, wherein the one or more other components comprise at least one of a vehicle radio, a headlamp, an electric window and any combination of the vehicle radio, the headlamp, and the electric window.

3. The battery system of claim 1, further comprising a supercapacitor charger, wherein the supercapacitor charger is in electrical connection with the supercapacitor device and the battery, wherein the supercapacitor charger is configured to charge the supercapacitor device using power from the battery while the engine is running, wherein the controller is configured to cause the charging operation of the supercapacitor charger to stop in response to the engine starting to accelerate.

4. The battery system of claim 1, wherein the controller is configured to cause the supercapacitor device to bypass the battery and supply power to the one or more components of the battery system.

5. The battery system of claim 1, wherein the casing includes a flange, wherein the flange includes mounting apertures that are configured to receive mounting screws for mounting the casing to a surface.

* * * * *